(12) United States Patent
Hernandez Hernandez

(10) Patent No.: US 9,327,466 B2
(45) Date of Patent: May 3, 2016

(54) TOOL FOR TRANSPORTING AND SHAPING FLEXIBLE SHEET PARTS

(71) Applicant: SIMPLICITY WORKS EUROPE, S.L., Elche-Alicante (ES)

(72) Inventor: Adrian Hernandez Hernandez, Alicante (ES)

(73) Assignee: SIMPLICITY WORKS EUROPE, S.L., Elche—Alicante (ES)

( * ) Notice: Subject to any disclaimer, the term of this patent is extended or adjusted under 35 U.S.C. 154(b) by 0 days.

(21) Appl. No.: 14/649,611

(22) PCT Filed: Dec. 5, 2013

(86) PCT No.: PCT/ES2013/070849
§ 371 (c)(1),
(2) Date: Jun. 25, 2015

(87) PCT Pub. No.: WO2014/087038
PCT Pub. Date: Jun. 12, 2014

(65) Prior Publication Data
US 2015/0343731 A1 Dec. 3, 2015

(30) Foreign Application Priority Data
Dec. 5, 2012 (ES) .............................. 201231305 U

(51) Int. Cl.
*B29D 35/00* (2010.01)
*A43D 11/00* (2006.01)
(Continued)

(52) U.S. Cl.
CPC .............. *B29D 35/128* (2013.01); *A43D 11/00* (2013.01); *A43D 13/00* (2013.01); *A43D 111/00* (2013.01); *B65H 3/08* (2013.01); *B65H 3/64* (2013.01); *B65H 5/22* (2013.01); *B65H 5/222* (2013.01);
(Continued)

(58) Field of Classification Search
CPC ........ B29C 31/008; B29C 31/08; B65H 3/08; B65H 3/64; B65H 5/22; B65H 5/222; B65H 9/08; B65H 2301/5121; B65H 2406/343; B29D 35/128; A43D 11/00; A43D 13/00
USPC .......................................... 425/126.1; 279/3
See application file for complete search history.

(56) References Cited

U.S. PATENT DOCUMENTS 2,729,040 A * 1/1956 Wallace ................. B23Q 1/032
269/21
2,850,279 A * 9/1958 Stoothoff ............. B65H 3/0883
269/21

(Continued)

FOREIGN PATENT DOCUMENTS

| CA | 2476441 A1 | 8/2003 | |
| DE | 102011056033 A1 * | 6/2013 | ............. B29C 31/08 |
| ES | 2022782 A6 | 12/1991 | |

OTHER PUBLICATIONS

International Search Report dated Feb. 6, 2014 for PCT/ES2013/070849 and English translation.

*Primary Examiner* — Robert B Davis
(74) *Attorney, Agent, or Firm* — Lucas & Mercanti, LLP

(57) ABSTRACT

Tool for transporting and shaping flexible laminar parts, which comprises a chamber 1 having a flexible and impermeable wall, with a bottom 3 provided with though holes 6. The chamber 1 houses a flexible and impermeable plate, a rigid plate 4, which reproduces the final three-dimensional shape that the flexible laminar part 5 has to adopt, and a suction tube 8.

2 Claims, 2 Drawing Sheets

(51) Int. Cl.
*A43D 13/00* (2006.01)
*B29D 35/12* (2010.01)
*B65H 5/22* (2006.01)
*B65H 3/08* (2006.01)
*B65H 3/64* (2006.01)
*B65H 9/08* (2006.01)
*A43D 111/00* (2006.01)

(52) U.S. Cl.
CPC .......... *B65H 9/08* (2013.01); *B65H 2301/5121* (2013.01); *B65H 2406/343* (2013.01)

(56) References Cited

U.S. PATENT DOCUMENTS

| | | | | |
|---|---|---|---|---|
| 3,275,317 A | * | 9/1966 | Fromm, Jr. | B65H 3/08 271/106 |
| 3,490,415 A | * | 1/1970 | Harriman | A43D 11/00 118/204 |
| 4,066,039 A | * | 1/1978 | Fletcher | B05C 13/00 101/126 |
| 4,391,511 A | * | 7/1983 | Akiyama | G03F 7/24 269/21 |
| 4,788,577 A | * | 11/1988 | Akiyama | G03F 7/70691 355/53 |
| 5,556,505 A | * | 9/1996 | Hill | B32B 17/10954 156/563 |
| 5,780,074 A | * | 7/1998 | Blonigen | B29C 31/00 264/316 |
| 6,942,265 B1 | * | 9/2005 | Boyd | H01L 21/67742 294/189 |
| 7,271,006 B2 | * | 9/2007 | Reinhardt | B65H 1/08 156/765 |
| 7,891,655 B2 | * | 2/2011 | Williams | B65H 3/0816 270/58.33 |
| 8,690,149 B2 | * | 4/2014 | Eschlbeck | B65H 3/0816 271/104 |

* cited by examiner

TOOL FOR TRANSPORTING AND SHAPING FLEXIBLE SHEET PARTS

CROSS REFERENCE TO RELATED APPLICATION

This Application is a 371 of PCT/ES2013/070849 filed on Dec. 5, 2013 which, in turn, claimed the priority of Spanish Patent Application No. U201231305 filed on Dec. 5, 2012, both applications are incorporated herein by reference.

FIELD OF THE INVENTION

The present invention relates to a tool for transporting and shaping flexible laminar parts, especially designed to incorporate laminar parts made of a flexible material over assemblies or units of which they should form part, with a three-dimensional shape and an arrangement that matches or is very close to that which they should exhibit, once mounted over said assembly or unit.

The tool of the invention is applicable, for example, as a means for mounting pieces made of natural or artificial leather on molds by means of which three-dimensional articles, such as shoes, clothing and apparel, etc., are obtained.

BACKGROUND OF THE INVENTION

In the manufacture of articles based on laminar parts made of a flexible material, such as natural or artificial leather, which are mounted on a mold or support defining the shape of the article to be obtained, the mounting of said parts onto the support is carried out manually. The arrangement that the laminar part has to adopt on the mold or support is also achieved manually, by acting directly upon the part or closing the mold.

An example of the manufacture of articles of the mentioned variety is described, for instance, in the PCT application ES2010000108, relative to a shoe manufacturing process by means of a mold and a countermold between which a volume is determined that corresponds to that of the shoe to be obtained. The upper of the shoe consists of parts made of natural or artificial leather that, once cut, are mounted on the mold, which has on the surface thereof ribs, which are shorter in height than the thickness of the laminar parts and that determine the position and contour of said parts in the upper forming. Once all the laminar parts are arranged, the last-shaped countermold is coupled inside the mold. The entire assembly described is carried out in such a way as to determine between consecutive laminar parts a network of channels, which are limited by the mold and the counter-mold, and a plastic material that upon solidification, serves as binding means of the upper parts, is injected through the channel network thereof.

The upper parts should be mounted manually inside the mold, where, in addition, they should adopt a shape corresponding to the shoe area to be defined, which shape must also be realized manually and be completed by the coupling of the countermold.

DESCRIPTION OF THE INVENTION

The aim of the present invention is a tool that makes it possible to affix and move a flexible laminar part to its mounting position or site in addition to shaping it with the arrangement that it has to adopt in said mounting position, all automatically, which makes it possible to simplify the mounting operations, reduce time and ensure the correct positioning of said parts on the support or mold.

In the shoemaking process described above, the parts made of natural or artificial leather, which will make up the upper of the shoe, once cut, will be positioned such that they automatically enable access for the tool thereon, next performing, also automatically, the affixing and shaping of the part and the transport thereof in these conditions to the mold, placing it in the correct position over the same.

In this way, the tool of the invention makes it possible to automatize the assembly process of the upper parts over the last.

As it can be readily understood, the described procedure is applicable to the manufacture of any other article or product made up of laminar and flexible parts and generally to the manufacture of articles or products including an upper formed from flexible, laminar parts that must be bound to one another and adopt a given arrangement or shape.

The tool of the invention consists of a chamber with a flexible and impermeable wall, in which a flexible and impermeable plate is housed, attached at the bottom of said chamber, a rigid plated located above the flexible and impermeable plate, that reproduces the final three-dimensional shape to be adopted by the flexible laminar part; and a suction tube that protrudes outside through the mouth of the chamber and passes through the rigid plate and the flexible and impermeable plate and opens up between said sheet and the bottom of the chamber. The suction tube is further provided, behind the rigid plate, with holes on the wall thereof that communicate with the chamber.

The chamber is provided on the bottom, upon which the flexible and impermeable plate is positioned and matching thereof, with a plurality of through holes. In addition, the wall of this chamber is closed at its mouth over the suction tube, thus preventing the air from entering or exiting between the same.

With the described constitution, in order to affix and shape a flexible laminar part with the tool of the invention, the flexible and impermeable plate is arranged inside the chamber, over the bottom thereof and over this rigid plate, which reproduces the shape that must be adopted by the flexible laminar part to be transported and shaped. The suction tube passes through the rigid plate and the flexible and impermeable plate. Then, the mouth of the chamber through which the suction tube will protrude, is closed. With the tool thus prepared, it is arranged over the flexible laminar part that is going to be handled, with the bottom or base of the chamber matching the contour of the flexible laminar part. Then, inside the chamber a progressive vacuum is created through a suction tube, which will cause, on the one hand, the affixing of the flexible laminar part to be handled, by the suction originated through the holes of the bottom of the chamber having a flexible wall, and on the other, as said suction continues the curvature or deformation of the flexible and impermeable plate and the bottom of the chamber, until they are adapted onto the rigid plate. This deformation will drive the flexible laminar part, curving it until reaching the desired shape, as a function of the arrangement of the rigid plate.

BRIEF DESCRIPTION OF THE DRAWINGS

In the attached drawings is represented, by way of non-limiting example, a tool realized according to the invention, where.

DETAILED DESCRIPTION OF ONE EMBODIMENT

Figure 1:
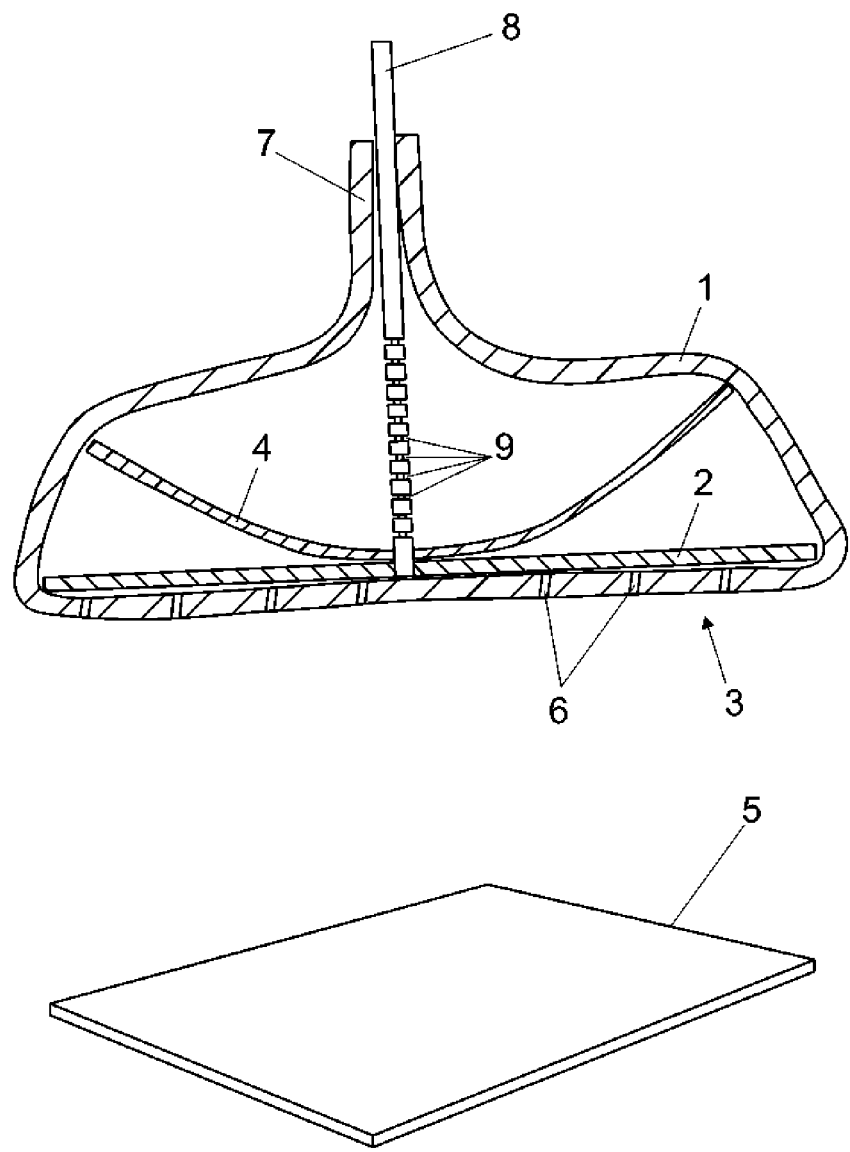
FIG. 1 shows a diametral section of the tool in the inactive position.

As shown in FIG. 1, the tool of the invention consists of a chamber 1 having a flexible and impermeable wall, in which a plate 2 is housed, that is also flexible and impermeable, and that is located on the bottom 3 of the chamber 1, and a rigid plate 4 that reproduces the three-dimensional shape to be adopted by the part 5 made of flexible material. The plate 2 shall be less flexible than the wall of the chamber 1.

The bottom 3 of the chamber 1 is crossed by a plurality of small holes 6.

A suction tube 8 penetrates into the chamber 1, through the mouth 7 thereof, and opens up through the end thereof under the plate 2, between the latter and the bottom 3 of the chamber 1. In addition, the suction tube opens up above the plate 2, through holes 9 made in the wall thereof.

The tool of the invention is designed to affix, shape and enable the transportation of a part 5 made of flexible material.

Figure 2:
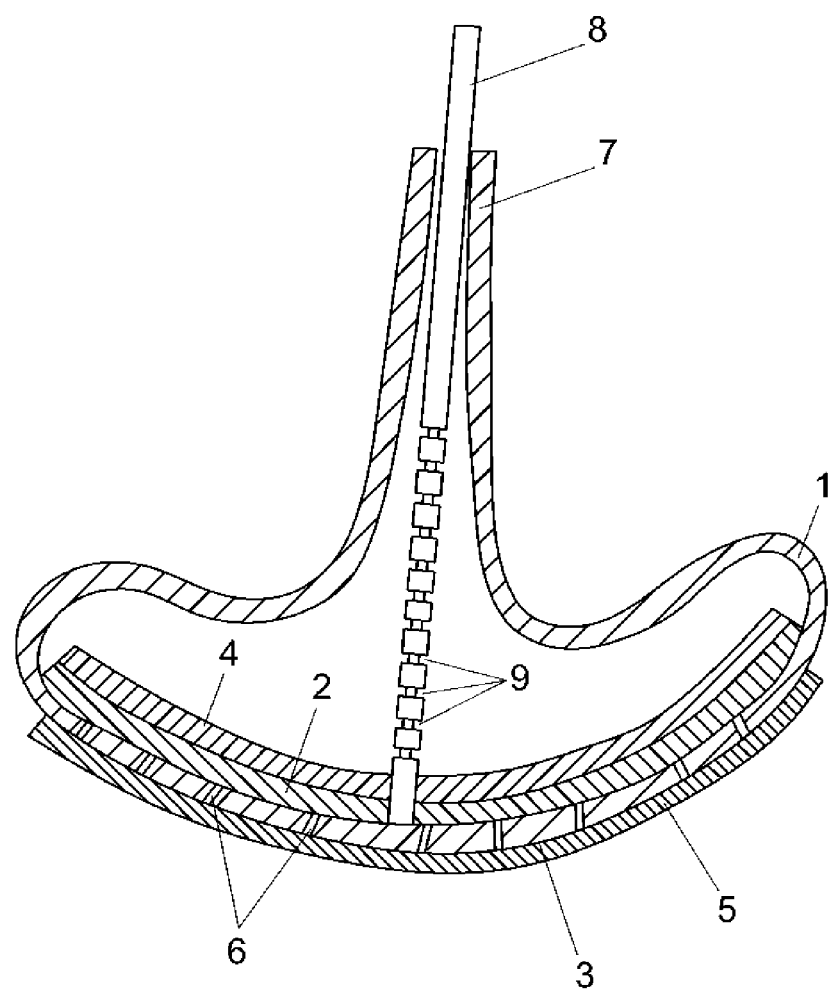
FIG. 2 shows a section similar to that of FIG. 1, with the tool in the active position, with a flexible laminar part adhered and shaped, for the transportation thereof.

To proceed with the affixing, shaping and transportation of the flexible laminar part 5 the chamber 1 is positioned over said part, such that the contour of the bottom 3 of the chamber 1 is in a position matching the contour of the flexible laminar part 5. The mouth 7 of the chamber 1 is closed, so that no air can penetrate or exit between said mouth and the suction tube 8. Next, the suction through the duct 8 begins, giving rise to a progressive degree of vacuum inside the chamber 1. This circumstance will cause the suction through the holes 6 on the bottom of the chamber 1, thus causing the affixing or adherence of the flexible laminar part 5. Upon increasing the degree of vacuum inside the chamber 1 the bottom 3 and the plate 2 undergo a deformation process, until both are adapted to the shape of the rigid plate 4 thus achieving the shaping of the laminar part 5, as represented in FIG. 2, at the same time the walls of the chamber 1 are partially folded inwards, thus reducing the volume of said chamber. By maintaining the suction through the duct 8, it is possible to transport the flexible laminar part 5 already shaped and adhered onto the outer surface of the bottom 3 of the chamber, to the site where said laminar part will be assembled.

The plate 2 shall be less flexible than the wall of the chamber 1, but with a flexibility such that it allows for the deformation thereof by the vacuum created inside said chamber, driven by the deformation of the bottom 3, to achieve the adaptation thereof over the rigid plate 4, as shown in FIG. 2, The tool of the invention may be arranged as a fixed assembly, for transporting a flexible part of a fixed size, which would be bent to a specific curvature. In the same way, the tool of the invention may be designed to accept different interchangeable parts, both rigid and semi-rigid, with different dimensions and arrangements, to apply different flexible parts.

To conclude, with the tool of the invention and by means of the suction produced through the suction tube 8, the laminar part 5 is successfully affixed, and is shaped with the form that it should adopt in the product of which it will form part, transported to said product and positioned on the same, in the situation and position that it must adopt to form part of said product.

The invention claimed is:

1. A tool for transporting and shaping flexible laminar parts, comprising a chamber having a flexible and impermeable wall, with a bottom provided with though holes, in which chamber are housed:
   a flexible and impermeable plate, which is attached to the bottom of the chamber and has a contour approximately equal to that of said bottom;
   a rigid plate, which reproduces the original three-dimensional shape to be adopted by the flexible laminar sheet and is located above the plate; and
   a suction tube, which protrudes tightly outside through the mouth of the chamber, passes through the rigid plate and the plate and opens up between said plate and the bottom of the chamber, through the open inner end thereof, and behind the rigid plate, through holes made in the wall of said tube.

2. The tool according to claim 1, wherein the plate is less flexible than the wall of the chamber.

\* \* \* \* \*